(12) United States Patent
Mitchell et al.

(10) Patent No.: US 9,930,529 B2
(45) Date of Patent: Mar. 27, 2018

(54) PHYSICAL SECURITY IN A SHARED, WIRELESS DATA COMMUNICATIONS NETWORK

(71) Applicant: THE BOEING COMPANY, Huntington Beach, CA (US)

(72) Inventors: Timothy M Mitchell, Seattle, WA (US); Nha Thanh Nguyen, Shoreline, WA (US); Anil Kumar, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 293 days.

(21) Appl. No.: 14/818,790

(22) Filed: Aug. 5, 2015

(65) Prior Publication Data

US 2017/0041792 A1  Feb. 9, 2017

(51) Int. Cl.
*H04W 12/08* (2009.01)
*H04W 84/06* (2009.01)

(52) U.S. Cl.
CPC ........... *H04W 12/08* (2013.01); *H04W 84/06* (2013.01)

(58) Field of Classification Search
CPC .............................. H04W 12/08; H04W 84/06
See application file for complete search history.

(56) References Cited

U.S. PATENT DOCUMENTS

| | | | |
|---|---|---|---|
| 6,879,237 B1 * | 4/2005 | Viarouge | ............... H01F 17/043 336/212 |
| 7,893,557 B2 | 2/2011 | Davis et al. | |
| 8,929,465 B2 | 1/2015 | Lee et al. | |
| 8,948,934 B2 | 2/2015 | Lee et al. | |
| 2004/0258141 A1 * | 12/2004 | Tustison | ................ H04B 3/548 375/219 |
| 2007/0022449 A1 * | 1/2007 | Boyden | ................ H04B 1/7163 725/81 |
| 2011/0102585 A1 * | 5/2011 | Kao | ......................... H04N 7/18 348/143 |
| 2012/0099627 A1 | 4/2012 | Mitchell et al. | |
| 2014/0074321 A1 | 3/2014 | Lee et al. | |
| 2014/0254693 A1 | 9/2014 | Mitchell et al. | |
| 2014/0312682 A1 | 10/2014 | Lee et al. | |
| 2014/0313629 A1 | 10/2014 | Lee | |
| 2014/0341309 A1 | 11/2014 | Nguyen et al. | |
| 2015/0016271 A1 | 1/2015 | Lee | |

FOREIGN PATENT DOCUMENTS

CN             1201274 A   *  12/1998  ........... H01Q 17/001

* cited by examiner

*Primary Examiner* — Baotran N To
(74) *Attorney, Agent, or Firm* — Coats & Bennett, PLLC

(57) ABSTRACT

A shared data communications system includes a network file server and two routers, each with its own address. A first router provides wireless access to a first part of the system. A second router provides wireless access to a second part of the same, shared system via the technique known as broadband-over-power line (BPL). In the second part, a first BPL unit is carried by the proximal end of an electrical conductor for receiving and sending signals between it and distal, second BPL unit on the same electrical conductor. The use of separate routers with different addresses and a power line to transmit and receive data to confine the wireless portion of the second part of the system to a smaller area increase the physical security of wireless communications with the second part, making it less likely data communications taking place in the second part will be accessed by others.

19 Claims, 3 Drawing Sheets

PHYSICAL SECURITY IN A SHARED, WIRELESS DATA COMMUNICATIONS NETWORK

TECHNOLOGICAL FIELD

The present disclosure relates generally to data communication security. More specifically, the present disclosure relates to data communication physical security in a shared data communications network.

BACKGROUND

Data networks are sometimes shared among unrelated parties. In an apartment building, an office building, or a passenger vehicle such as an air craft or cruise ship, the occupants and passengers may have access to communication networks provided for the convenience of tenants or passengers. These networks may be part of the same data communication network that is used by the operator of the building. As an example, an office building or apartment building may have a heating and air conditioning system and a security system, all of which are controlled by a computer with wireless sensors deployed throughout the building, and tenants in the building may be provided with wireless access via the same data communications network. As another example, an aircraft or cruise ship may have a data communications system for its operations, navigation, and safety, all controlled through a network file server that is also providing wireless access to passengers. Sharing networks among unrelated parties may be cost effective and convenient but may not be secure.

For example, FIG. 1 shows a typical, prior art, data communications configuration for a passenger aircraft. An onboard network system file server (NFS) is used to facilitate data communications throughout the aircraft: between the ground controllers and flight deck, between the flight deck and the cabin, and for entertaining and for otherwise occupying the attention of passengers. This data communications system is essential for operation of the aircraft both on the ground, at the gate, and in the air. In the flight deck, this data communication system receives input from various systems throughout the aircraft, from ground control, from gate operations, from sensors, and from global positioning satellites or an inertial reference unit. This information is relayed to the flight deck instrumentation, including the captain's display, an on-board maintenance laptop, and a printer, all of which access the NFS.

In the cabin, the crew uses wireless handsets, which connect to the NFS. Passengers receive in-flight entertainment through a connectivity server and wireless access so they can use cell phones and personal electronic devices and laptops for entertainment or working, as permitted. The NFS also provides wireless internet access for the flight deck.

Thus, in the aircraft, the data communications system of the aircraft is shared between the cabin and flight deck, and between flight crew and passengers. A concern with this arrangement is that a passenger might be able to hack into the data communications system and influence the aircraft. Similar concerns may also be present in other examples of shared data communications, such as those noted above: on a cruise ship, or in an office or apartment building with multiple unrelated tenants.

One way to provide data communications is by using a broadband-over-power line (BPL) link. In BPL, an electrical power conductor is electrically coupled to a broadband network, either coupled by induction or directly to the conductor. Data may then travel over the electrical conductor simultaneously with electrical power transfer regardless of whether the power line is used for transmission of power or not. BPL applications are described in U.S. Pat. Nos. 8,948,934; 8,929,465; 7,893,557; and in US Publications 2015/0016271, 2014/0341309; 2014/0313629; 2014/0312682; 2014/0254693; 2014/0074321; and 2012/0099627 which are all incorporated herein in their entirety by reference.

A method and system that improves the security a shared data communications network beyond the current level would be an important improvement in shared data communication networks.

BRIEF SUMMARY

The present disclosure is directed to improving the physical security of the data communication system by separating the operation of one part of a shared system from another part and by using broadband-over-power line technology.

A particular aspect of the disclosure is the combination of separate WIRELESS systems with their own routers and router addresses for the cabin and for the flight deck, and the use of broadband-by-power line to deliver WIRELESS access to the flight deck.

An aspect of the disclosure is a data communications system that includes a network file server and two separate routers in communication with the network file server. According to this aspect, a first router provides wireless access to a first part of the shared system; a second router provides wireless access to a second part of the same, shared system via the technique known as broadband-over-power line. In that second part, a first broadband power line (BPL) unit is carried by the proximal end of an electrical conductor. This first BPL unit receives signals from the second router and applies the electrical pulses to the electrical conductor, pulses that correspond to those received signals. A second BPL unit, spaced apart from the first, is carried by the distal end of the electrical conductor. It derives signals from the electrical pulses transmitted via the electrical power line and then transmits them wirelessly within the second part of the shared system. Likewise, the second BPL unit also receives wireless signals from within the second part of the shared system, applies the electrical pulses at the distal end of the electrical conductor so they can be received via by the first BPL unit on the proximal end of the conductor, convert the pulses to signals and send them to the second router and back to the network file server for further processing.

Another aspect of the data communications network is that the first router has a first address and said second router has a second, different address.

Still another aspect of the data communications network is that it may be installed in a vehicle, such as an aircraft, and the first router is placed in a first part of the vehicle, such as the passenger cabin of the aircraft, and the second router is placed in a second part of the vehicle, such as the flight deck.

Yet another aspect of the disclosure is a data communications network in which the electrical conductor carries electrical power in addition to the electrical pulses, and the electrical power has a frequency which may range from 50 Hz-1000 Hz Another aspect of the disclosure is a method for modifying an existing shared data communications system by inserting a first router with a first address between a wireless access point in first part of a wireless network and a network file server, and then inserting a second router with a second address different than the first address between a wireless access point in a second part of the wireless network and the network file server. Next, insert two, spaced-apart BPL units between the second router and the wireless access point, and couple them to an electrical conductor, and then connect the router to the proximal BLP unit and the wireless access point to the distal BLP unit.

BRIEF DESCRIPTION OF THE DRAWINGS

Figure 1:
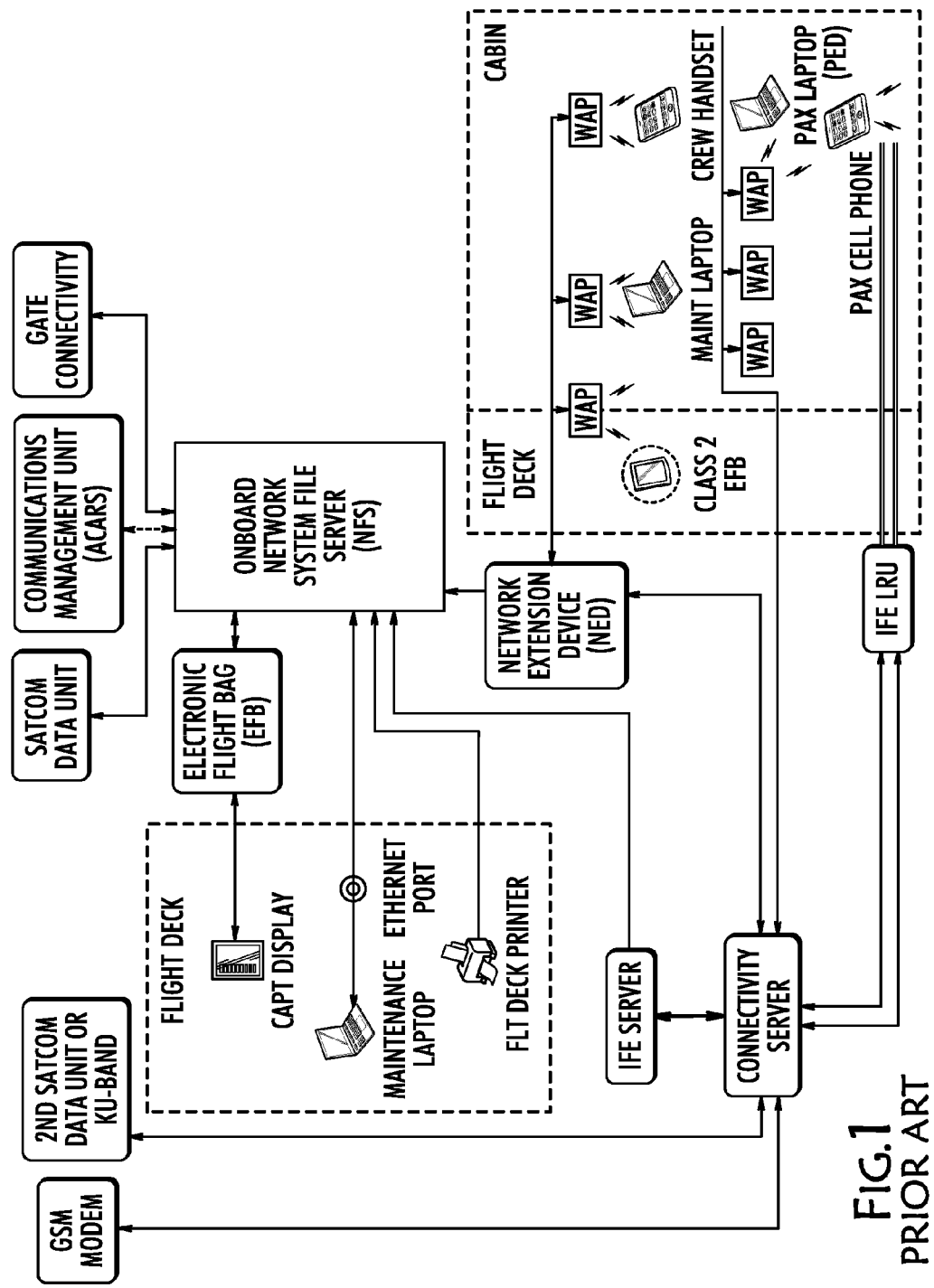
Figure 2:
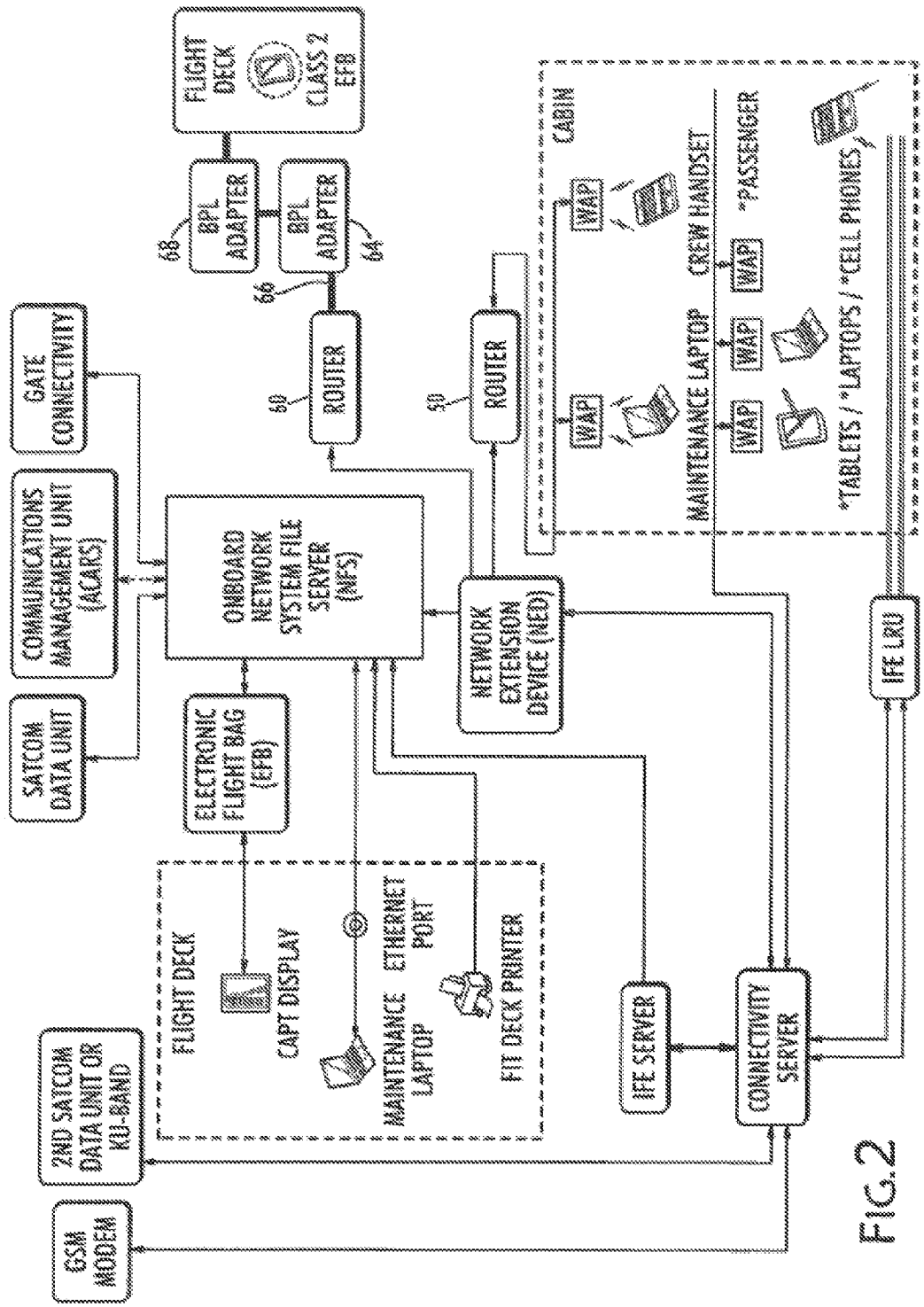
Figure 3:
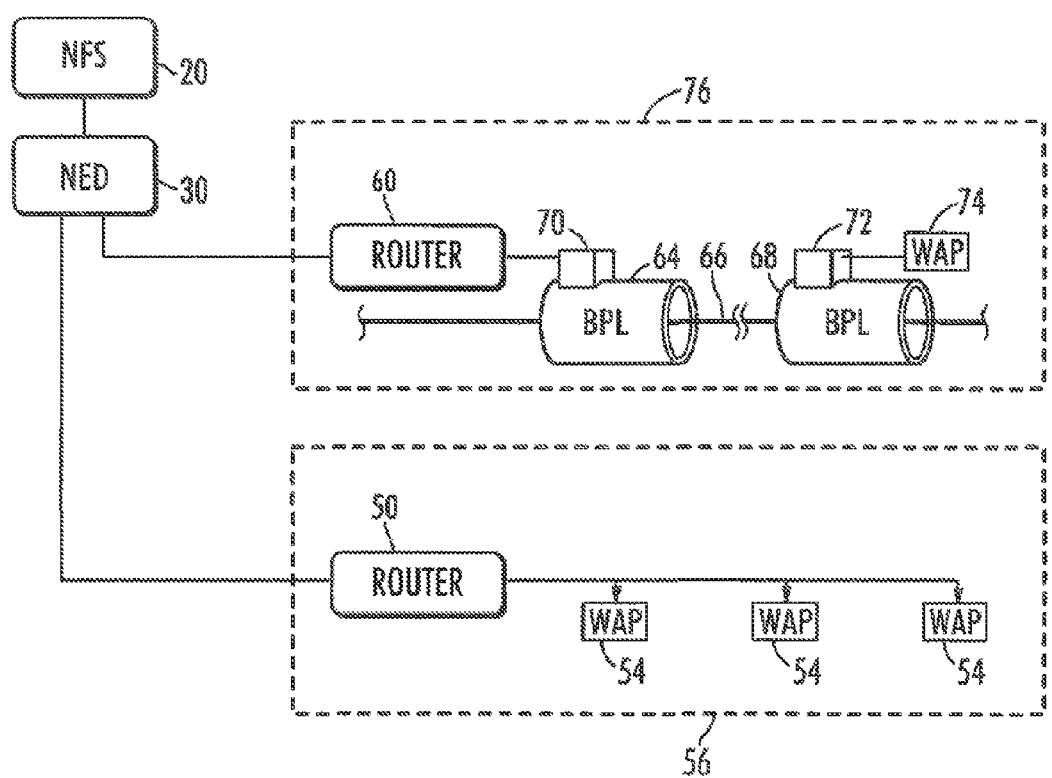

Having thus described variations of the disclosure in general terms, reference will now be made to the accompanying drawings, which are not necessarily drawn to scale, and wherein:

FIG. 1 is a schematic diagram of the communications system aboard an aircraft, according to the prior art;

FIG. 2 is a schematic diagram showing the diagram of FIG. 1 modified according to aspects of the disclosure, as an example of a data communications system according to the disclosure;

FIG. 3 is a detailed schematic diagram of the broadband on power line portion of the schematic of FIG. 2.

DETAILED DESCRIPTION

The present disclosure concerns the physical security of a data communications network that is shared. By shared, it is meant that certain components of that network are used by at least one other who is not the owner of the network. A data communications network in this disclosure refers to a set of components within an area that are in communication with and responsive to each other and are used to send and receive signals and messages in digital form through those components. A data communications network includes at least a network file server. Users may be connected to the network file server directly or through an intermediate device such as a network extension device as shown or network installation management device.

The term BPL unit refers to a combination of a modem and an electrical coupler that is attached to a power line. The power line, whether already in use for carrying power and thus selected for its convenience, or simply a length of electrical power line impressed into service for this purpose, serves as a conductor of voltage pulses that may carry information. The BPL unit converts received digital input to voltage pulses directly or indirectly by electromagnetic induction in an electrical conductor in the power line, and conversely generates signal from voltage pulses received from a power line to output them for wireless communication at an Ethernet port of the second BPL unit. Accordingly, two such BPL units are required, a first one to apply data to a power line and then a second one to extract it from the power line. The power line may carry electrical power simultaneously with the data pulses.

The term wireless is a local area computer networking technology using a suitable frequency (UHF such as 2 GHz to microwave of up to 60 GHz) to enable signals to be sent between component of a data communications system. WI-FI is a registered trademark of the Wi-Fi Alliance for wireless communications in the 2.4 GHz-5.8 GHz range and is based on IEEE 802.11 standards.

Referring now to FIGS. 2 and 3, which are schematic diagrams of aspects of the disclosure. FIG. 2 parallels FIG. 1 except for a portion of the data communications system of FIG. 1 that has been modified according to aspects of the disclosure. FIG. 3 provides a detail of the aspects involving sending broadband over a power line.

In FIG. 2, most of the components of the data communications system are the same as shown in FIG. 1. An important difference is the insertion of two routers. The first router 50 between the network extension device and the passenger cabin. This network extension device is in communication as before with the onboard network system file server. From its Ethernet port is a line that provides wireless access points (WAP) throughout the cabin for the laptops and handsets of flight attendants and maintenance crew, and for passengers' laptops, handsets, tablets, personal electronic devices and cell phones.

The second router 60 supplied wireless access points to the flight deck and uses two broadband over power line (BPL) units and a power line 66 to do so.

FIG. 3 illustrates details of a portion of FIG. 2. In particular, there is a network file server (NFS) 20 that is in communication with the other parts of the data network shown either directly or indirectly. NFS 20 is connected to a network extension device (NED) 30 that facilitates connection of other components to the NFS 20. Connected to NED 30 are two routers, a first router 50 and a second router 60. First router 50 has a first router address and provides internet access via wireless access points 54 (WAP) throughout a first part 56 of an area served by NFS 20.

Second router 60 has a second router address different from first router's 50 address. Second router 60 is connected to a first BPL Unit 64 carried by a proximal end of a power line 66 and to a second BPL unit 68 carried by a distal end of power line 66. First BPL unit 64 has an integrated modem/inductor 70 that receives digital signals from router 60 and applies electrical pulses to power line 66 thereby converting digital signals into voltage pulses that correspond to the digital signals received from router 60. These voltage pulses travel power line 66 to second BPL unit 68. There, another integrated modem/inductor 72 senses the pulses on power line 66, and generates digital signals corresponding to the pulses for delivery wirelessly through a wireless access provider 74 in the second part 76 of the area served by network file server.

The arrangement just described also works in the opposite direction. Wireless communications in second part 76 are picked up by wireless access provider 74 and forwarded to modem/inductor 72 which proceeds to apply pulses to power line 66 that correspond to the digital signals received from wireless provider 74. These pulses travel from the distal end of power line 66 to its proximal end where they are picked up by modem/inductor 70, converted to digital signals and forwarded to second router 60.

Power line 66 may be a convenient power line running near first router 50 and second router 60, such as, for example, a DC power bus, a power line carrying alternating electrical power at a commercial grid frequency, such as 50 or 60 Hz, or the typical frequency range for an AC power infrastructure line on an aircraft, typically in a range 380 Hz-800 Hz, but BPL units may operate using an electrical conductor that may be a power line and may carry DC or AC power, and, if the latter, at a frequency anywhere from 50 Hz to 1000 Hz. BPL units will typically apply signals to the power line which are transmitted in the range of 2 GHz to 60 GHz. The lower end of this range, 2.4 GHz to 5.8 GHz, is the range for conventional Wi-Fi.

In an existing shared data communication system having two (or more) parts, additional physical security can be obtained by inserting first router 50 with a first address between a wireless access point 54 in the first part 56 of the wireless network and its network extension device 30, and inserting a second router 60 with its second address between a wireless access point 74 in the second part 76 of the wireless network and network extension device 30. The two addresses of the two routers 50, 60, may be different. Furthermore, between the second router 60 and the wireless access point 74 in that part 76 of the shared data communications system, two BPL units 64, 68, may be inserted and attached to a convenient electrical conductor 66, with the two BPL units 64, 68 being spaced apart on electrical conductor 66. Then router 60 is connected to proximal BPL unit 64 and wireless access point 74 is connected to distal BPL unit 68.

Second part 76 is then isolated from first part 56 in that wireless communications in one travel independently to and from the separate routers in accordance with the router address chosen by the senders. Moreover, the use of BPL units 64, 68, and a power line 66 to send communications to physically separated wireless areas prevents use of the flight deck wireless access point 64 by passengers in area 56 and reduced the possibility of cross talk.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations.

What is claimed is:

1. An aircraft, comprising:
    a passenger cabin;
    a flight deck;
    a network file server computer;
    a broadband over power line (BPL) network path segment comprising first and second BPL units communicatively coupled to each other via an electrical power conductor;
    first and second communication paths, each communicatively coupled to the network file server computer and a respective wireless access point (WAP) in the aircraft, wherein the first and second communication paths are configured to support network communication between the network file server computer and at least one user in the passenger cabin and the flight deck, respectively, at different levels of physical security from each other by avoiding and including the BPL network path segment, respectively.

2. The aircraft of claim 1, further comprising:
    wherein the first communication path comprises a first router, the first router being communicatively coupled to the network file server computer and the WAP of the first communication path;
    wherein the second communication path comprises the BPL network path segment and a second router, wherein the second router is communicatively coupled to the BPL network path segment and the network file server computer;
    wherein the first BPL unit is configured to convert signals received from the second router into electrical pulses transmitted to the second BPL unit over the electrical power conductor, and convert electrical pulses received from the second BPL unit over the electrical power conductor into signals transmitted to the second router;
    wherein the second BPL unit is configured to convert signals received from the WAP of the second communication path into electrical pulses transmitted to the first BPL unit over the electrical power conductor, and convert electrical pulses received from the first BPL unit over the electrical power conductor into signals transmitted to the WAP of the second communication path.

3. The aircraft of claim 1, wherein said aircraft has a DC bus and wherein said electrical power conductor is said DC bus.

4. The aircraft of claim 1, wherein said aircraft has an alternating current infrastructure operating on alternating current and wherein said electrical power conductor is connected to said alternating current infrastructure.

5. A data communications system supporting network communication within a vehicle, the data communications system comprising:
    a network file server computer within the vehicle;
    a broadband over power line (BPL) network path segment comprising first and second BPL units communicatively coupled to each other via an electrical power conductor;
    first and second communication paths within the vehicle, each communicatively coupled to the network file server computer and a respective wireless access point (WAP) in the vehicle, wherein the first and second communication paths are each configured to support network communication between the network file server computer and at least one user in a respective part of the vehicle at a level of physical security different from the other by avoiding and including the BPL network path segment, respectively;
    wherein the first communication path comprises a first router, the first router being communicatively coupled to the network file server computer and the WAP of the first communication path;
    wherein the second communication path comprises the BPL network path segment and a second router, wherein the second router is communicatively coupled to the BPL network path segment and the network file server computer;
    wherein the first BPL unit is configured to convert signals received from the second router into electrical pulses transmitted to the second BPL unit over the electrical power conductor, and convert electrical pulses received from the second BPL unit over the electrical power conductor into signals transmitted to the second router;
    wherein the second BPL unit is configured to convert signals received from the WAP of the second communication path into electrical pulses transmitted to the first BPL unit over the electrical power conductor, and convert electrical pulses received from the first BPL unit over the electrical power conductor into signals transmitted to the WAP of the second communication path.

6. The data communications system as recited in claim 5, wherein said first router has a first address and said second router has a second address and wherein said second address is different than said first address.

7. The data communications system as recited in claim 5, further comprising a network extension device in communication with said network file server computer, said first and second routers being in communication with said network file server computer via said network extension device.

8. The data communications system as recited in claim 5, wherein the first router is in the part of the vehicle supported by the first communication path and the second router is in the part of the vehicle supported by the second communication path.

9. The data communications system as recited in claim 5, wherein said vehicle is an aircraft.

10. The data communications system as recited in claim 9, wherein said first router is in a passenger cabin and said second router is in a flight deck.

11. The data communications system as recited in claim 5, wherein said electrical conductor carries electrical power in addition to said electrical pulses.

12. The data communications system as recited in claim 5, wherein said electrical conductor carries electrical power in addition to said electrical pulses, said electrical power in the form of direct current.

13. The data communications system as recited in claim 5, wherein said electrical conductor is a direct current bus on an aircraft.

14. The data communications system as recited in claim 5, wherein said electrical conductor carries electrical power in addition to said electrical pulses, said electrical power in the form of alternating current.

15. The data communications system as recited in claim 5, wherein said electrical conductor carries alternating current having a frequency in a range of 50 HZ to 1000 Hz.

16. The data communications system as recited in claim 5, wherein said electrical conductor carries alternating current having a frequency in a range of 380 HZ to 800 Hz.

17. The data communications system as recited in claim 5, wherein said signals have a frequency of at least 2 GHz.

18. The data communications system as recited in claim 5, wherein said signals have a frequency in the range 2 GHz to 60 GHz.

19. A method of supporting network communication within a vehicle, implemented in a data communications network, the method comprising:
receiving requests for network communication with a network file server computer within the vehicle from a first user and a second user in respective parts of the vehicle via respective wireless access points (WAP) in the vehicle;
supporting the network communication within the vehicle at a different level of physical security for the first user as compared to the second user by carrying signaling within the vehicle over respective communication paths that comprise respective routers and that avoid and include, respectively, a broadband over power line (BPL) network path segment;
wherein the BPL network path segment comprises first and second BPL units communicatively coupled to each other via an electrical power conductor.

\* \* \* \* \*